Jan. 18, 1966     L. T. BARNES     3,230,430
VARIABLE CAPACITOR
Filed May 24, 1960     2 Sheets-Sheet 1
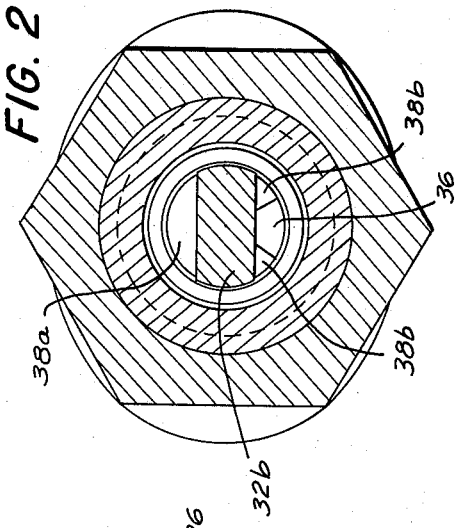
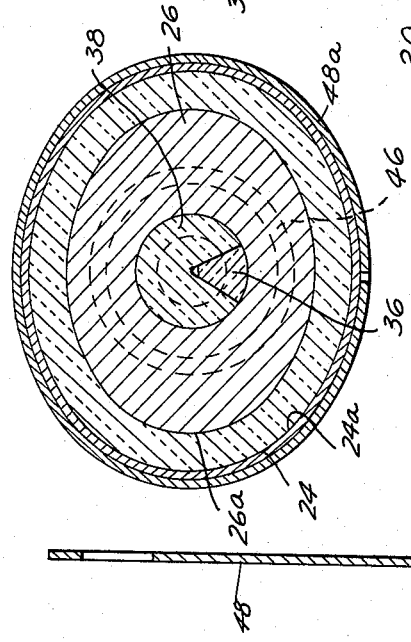
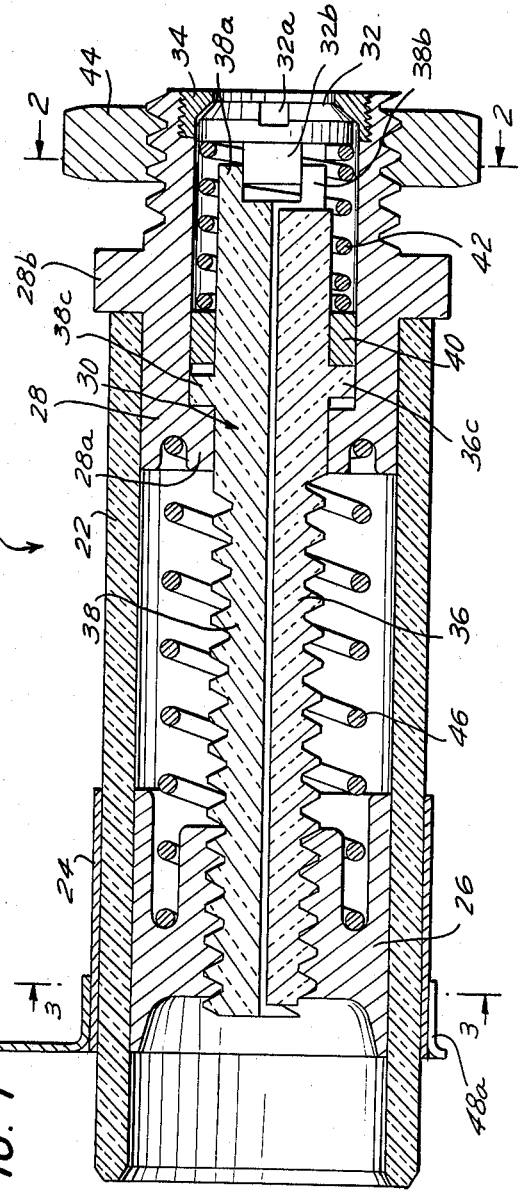
INVENTOR.
LLEWELLYN T. BARNES
BY
*Amster & Levy*
ATTORNEYS Jan. 18, 1966
L. T. BARNES
3,230,430
VARIABLE CAPACITOR
Filed May 24, 1960
2 Sheets-Sheet 2
FIG. 4
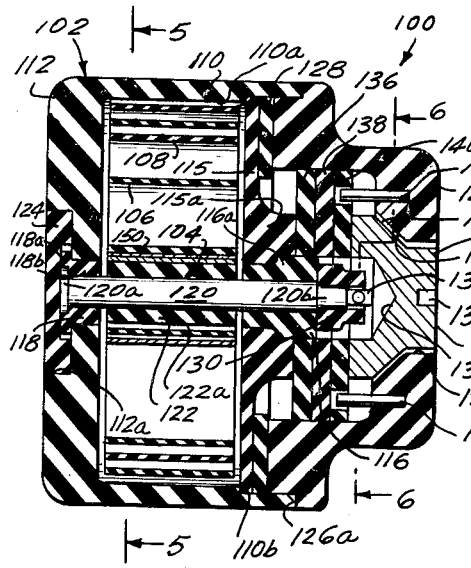
FIG. 5
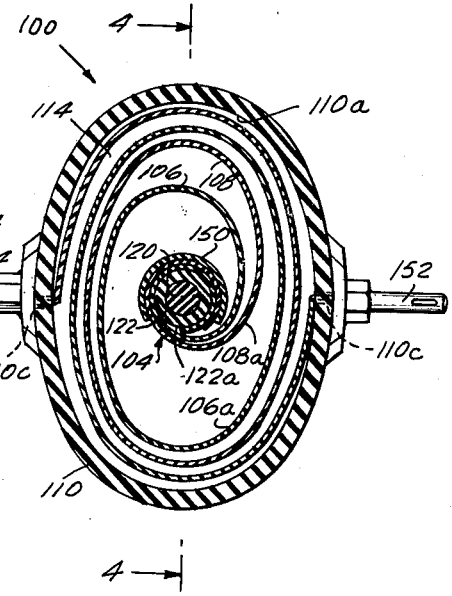
FIG. 6
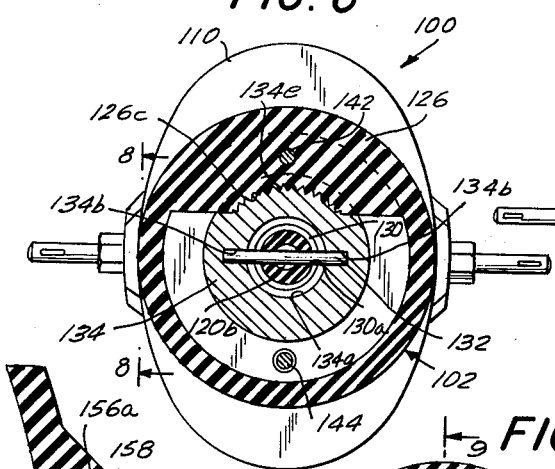
FIG. 7
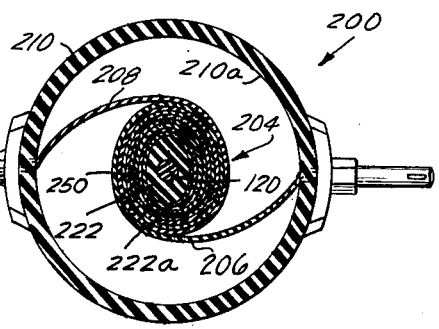
FIG. 8
FIG. 9
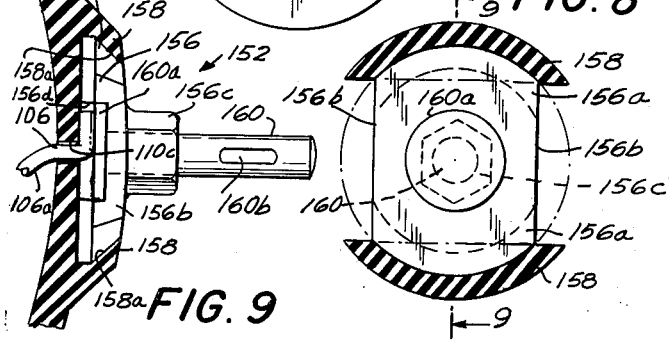
INVENTOR.
LLEWELLYN T. BARNES
BY Amster & Levy
ATTORNEYS

United States Patent Office 3,230,430
Patented Jan. 18, 1966

3,230,430
VARIABLE CAPACITOR
Llewellyn T. Barnes, 155 Atlantic Ave., Freeport, N.Y.
Filed May 24, 1960, Ser. No. 31,288
9 Claims. (Cl. 317—249)

This application contains subject matter identical to that disclosed in my copending United States patent application, Serial No. 722,773, filed March 20, 1958, now Patent No. 2,984,776, entitled "Variable Condenser," and constitutes a continuation-in-part thereof.

This invention relates to improvements in electrical capacitors, particularly having a variable capacitance.

In many circuits there are employed capacitors having spaced confronting electrodes, the capacitance frequently being variable by movement of the electrodes to tune the utilizing circuit. It is generally desirable to provide such capacitors with as great a range of capacitance variation and as high a maximum capacitance as possible, so as to achieve a large tuning range for the utilizing circuit, and so as to allow reduction of the size of capacitors of any given capacitance.

It is therefore an object of this invention generally to provide a capacitor of greatly increased maximum capacitance and extended range of variation thereof.

An additional object of the invention is to provide a variable capacitor which is accurately and linearly adjustable over a large range of capacitance variation, and which holds a given adjustment under adverse conditions, yet is simply and economically constructed.

In accordance with an illustrative embodiment demonstrating features of the invention, there is provided a capacitor comprising a pair of electrodes positioned in spaced confronting relation, the confronting surfaces of the electrodes being of oval cross-section. In a variable capacitor embodying the invention, the electrodes may be movable relative to each other to vary the spacing therebetween, or preferably the electrodes may be made resilient and means may be provided to vary the cross-sectional contour thereof.

The foregoing brief summary, as well as additional features of the invention, may best be appreciated by reference to the following detailed description, when read in conjunction with the accompanying drawings, in which:

FIG. 1 is a longitudinal section of a variable capacitor of the coaxially reciprocable electrode type, constructed in accordance with this invention;

FIG. 2 is a section taken along the line 2—2 of FIG. 1;

FIG. 3 is a section taken along the line 3—3 of FIG. 1;

FIG. 4 is a longitudinal section, taken along the line 4—4 of FIG. 5, of a variable capacitor of the spirally wound electrode type, constructed in accordance with this invention;

FIG. 5 is a section taken along the line 5—5 of FIG. 4;

FIG. 6 is a section taken along the line 6—6 of FIG. 4;

FIG. 7 is a sectional view, similar to FIG. 5, of a further embodiment of a variable capacitor of the spirally wound electrode type;

FIG. 8 is an enlarged section taken along the line 8—8 of FIG. 6; and,

FIG. 9 is a section taken along the line 9—9 of FIG. 8.

I have made the interesting and useful discovery that the shape of the electrodes of a capacitor can have a hitherto unexpected effect on the capacitance thereof. Specifically, I have observed experimentally that in a given type of capacitor, the capacitance thereof, or the maximum capacitance in the case of a variable capacitor, attains its highest value when the confronting electrode faces of the capacitor are both of a particular oval contour, which appears to be elliptical or nearly so.

The increase in capacitance resulting from modification of the contour of the confronting electrode faces in accordance with this discovery is surprisingly large. This fact has been demonstrated by me in various experiments in which capacitance was observed as a function of the contour of the capacitor electrodes. In these experiments I made a resilient capacitor sandwich by interposing a dielectric layer of waxpaper between two electrode layers of aluminum foil. One experiment involved a circular cylinder which was formed from one thickness of such a capacitor sandwich. In its circular shape the capacitor was found to have a capacitance of about 25 mmfd. Then a non-conductive material was used to compress the cylinder gradually into a roughly elliptical cross-sectional shape. As a result, the capacitance rose to a maximum of about 52 mmfd., remaining steady for any given shape of the cylinder up to that point. Later, when the cylinder was compressed almost flat, the capacitance rose temporarily to about 60 mmfd. but soon dropped all the way down to approximately the original value of the circular shape. From this it is concluded that there is an optimum oval shape which maximizes the steady value of the capacitance.

A possible theoretical explanation for these results is as follows: It is known from general principles of electrostatics that a charge on a conductive body, such as a capacitor electrode, tends to distribute itself about the surface of the body in such a way that the potential of all parts of the surface is equal. It follows mathematically from this that the charge density will be unequal at different parts of the surface which have different curvatures. In particular, the charge tends to concentrate at the more sharply curved convex parts of the surface, so that the accumulation of charge at a given point on the surface is inversely proportional to the radius of curvature at that point. Accordingly, if a pair of circularly shaped, concentrically disposed charged conductors are deformed into an oval or elliptical shape, the charge, which was originally distributed evenly thereabout, begins to concentrate at the end of the ellipse as the conductors are pressed flatter. The concentration of the charge on the conductors at these locations seems to be the reason for the surprisingly large increase in capacitane as a function of shape.

The concentration of charge at the ends of the ellipse increases as the flattening of the conductor increases, but after a certain optimum shape is reached further flattening may cause the charge density at these locations to become so great that the charge begins to leak off, probably by means of a convection discharge. In the latter phenomenon successive air molecules coming into contact with a highly charged, sharply curved surface become charged thereby and are subsequently electrostatically repelled therefrom to produce a continuous loss of charge. This is known to be the cause of certain luminous discharges from sharply curved or pointed objects, such as St. Elmo's fire which is occasionally seen at the tips of poles. It is thought that the shape which maximizes the steady value of the capacitance is that which gives rise to a maximum retainable charge density. It is suspected this shape is an ellipse, or something fairly close to it.

The change of capacitance as a function of shape is even more startling when the dielectric sandwich is wound spirally about itself to produce several thicknesses thereof and is then varied between generally round and oval configurations. In other experiments cylindrical and spiral capacitor sandwiches of the type described were pressed flat in the same manner and the increases in their respective capacitances as a function of shape were compared. Increases of the order of 200% have been observed with the cylindrical capacitor in some of the experiments, but the spiral capacitor, which has a substantially larger capacitance for any given dimensions even in the round condition, showed increases of between 1000% and 2000% when flattened.

As a possible explanation of this difference, it is known that capacitance increases as the spacing between the confronting electrodes decreases. Normally this is subject to the physical limitation that some thickness of dielectric material sufficient to resist arcing must remain between the confronting electrodes. With the multiple interweaving effect of a spiral winding, which intensifies the electric field and arranges the electrodes so that each electrode is positioned inside as well as outside the other electrode, it may be that the capacitance rises to a level that is mathematically equivalent to zero or negative electrode spacing, while nevertheless maintaining the actual interposition of a dielectric layer therebetween. When these effects are multiplied by compressing the spiral winding into an oval shape to further intensify the concentration of charge, surprising increases in capacitance result.

Referring in detail to the drawings, FIGS. 1–3 show a variable capacitor 20 including a dielectric in the form of a hollow ceramic tube 22 on the outside surface of which is a coating 24 of conductive material serving as a fixed electrode. A piston 26 slidably disposed within the interior of tube 22 is formed of a conductive material and thus constitutes a movable electrode, adjustment of the piston 26 along the length of tube 22 serving to vary the capacitance.

A mechanism is provided for accurate adjustment of the piston 26 without backlash or play, so as to achieve virtually linear variation of capacitance as a function of movement of the adjusting mechanism. A plug 28 formed of a conductive material is tightly inserted into the front end of the tube 22 and is formed with an axial bore constricted at the rear by an internal annular flange 28a. The latter serves to journal a rotary shaft 30 extending axially through the bore of plug 28. The rear end of shaft 30 is threaded and screwed into a tapped axial bore formed in the piston electrode 26, so that rotation of the shaft 30 is effective to cause axial travel of the electrode 26, thus varying the capacitance.

For rotating the shaft 30 there is provided a driving nut 32 journaled on an annular mounting collar 34 threaded to the front end of the bore of plug 28. The forward surface of driving nut 32 is formed with a screwdriver slot 32a accessible through the center of the annular mounting collar 34 to facilitate rotation of the nut 32. This nut is in turn connected to the shaft 30 to produce the desired capacitance-varying rotation thereof. As seen in FIG. 3, shaft 30 is split into two different longitudinal parts: a smaller segment 36 of wedge-shaped cross-section, and a larger segment having a cross-section extending over the remaining major arc of a circle. FIGS. 1 and 2 show an upper cleat 38a and a pair of lower cleats 38b located on either side of the wedge segment 36 projecting forwardly from the major segment 38. A driving key 32b projecting rearwardly from the nut 32 fits closely between the upper and lower cleats and thus turns the major segment 38 in response to turning of the driving nut 32.

The shaft 30 rotates as a whole, even though the driving connection is only to the major segment 38, because of the way the wedge segment 36 is embraced between the confronting walls of the major segment. The purpose of splitting the shaft 30 into two segments in this manner is to provide for independent axial movement thereof. Projections 38c and 36c extend upwardly and downwardly from the major and wedge segments 38 and 36 respectively within the bore of plug 28, the projection 36c being somewhat forward of the projection 38c. A washer 40 disposed within the bore of plug 28 surrounds the shaft 30 forwardly of the projection 36c and in contact therewith. A strong spring 42 operates compressively between the washer 40 and driving nut 32 to bias the wedge segment 36 rearwardly, the driving nut 32 being retained in the bore of plug 28 by the mounting collar 34. The threaded connection between wedge segment 36 and piston 26 causes the rearward biasing force on the segment to be transmitted to the piston, which in turn, because of its threaded connection to major segment 38, exerts a rearward pressure on the latter. The major segment 38, however, is prevented from responding to this pressure because the projection 38c thereof soon abuts against the flange 28a. As a result, the two segments of shaft 30 are constantly tensed in opposite directions relative to the piston 26, so that the threads of the shaft 30 are always firmly engaged against the threads of the piston 26 in both axial directions simultaneously, thereby preventing lost motion when the capacitor is adjusted first in one direction and then in the other. This creates a linear relationship between the rotary motion of the driving mechanism and the axial capacitance-varying motion of the electrode piston 26.

Insertion of the plug 28 into the bore of the tube 22 is limited by an external annular flange 28b. The plug 28 projects forwardly of this flange to provide a neck for insertion through a mounting aperture in a chassis, this neck being externally threaded to receive a tightening nut 44 which cooperates with the flange 28b to clamp the edge of the chassis aperture therebetween for securing the capacitor 20 in place. The conductive plug 28 thereby makes electrical contact to the chassis. A light spring 46 formed of a conductive material disposed within the bore of tube 22 surrounding the shaft 30 and operates compressively between the plug 28 and piston 26 to provide a self-adjustable electrical connection therebetween which automatically compensates for different positions of the piston 26 and always provides a good pressure contact at both ends. Thus, the electrode piston 26 is grounded to the chassis through the spring 46 and plug 28. The fixed electrode 24 on the outside of the dielectric tube 22 is provided with a terminal post 48 for connection to the other side of the circuit, this post terminating in a split ring 48a which snaps in place about the electrode coating 24 to make firm electrical contact thereto. Further details of the construction of the capacitor 20, although not necessary to a full understanding of the invention, may be found in my copending United States patent application, Serial Number 722,773 filed March 20, 1958, now Patent No. 2,984,776, entitled "Variable Condenser," of which this application is a continuation-in-part.

In accordance with this invention, the terminal ring 48a, electrode coating 24, dielectric tube 22, and electrode piston 26 are all formed with an elliptical cross-section in a vertical plane, as seen in FIG. 3. Consequently, the confronting surfaces 24a and 26a of electrodes 24 and 26 respectively are substantially parallel and of elliptical shape to maximize the upper limit of the capacitance range in accordance with my discovery. Therefore the capicitor 20 will have a higher maximum capacitance, and a greater range of capacitance variation for tuning purposes. It will also be apparent to those skilled in the art that the novel elliptical electrode and dielectric construction taught herein can be used to advantage in a fixed capacitor, thereby achieving a greater value of capacitance for a given size of capacitor.

Reference is next made to FIGS. 4–9, which show illustrative embodiments of a novel type of variable capacitor in which resiliently deformable electrodes are spirally wound and the capacitance is varied primarily by varying the cross-sectional shape of the winding between elliptical and circular configurations. In FIGS. 4–6 there is seen a capacitor 100 comprising an ellipitical casing 102, a circular arbor 104 extending through the interior of the casing 102, and a pair of electrode-bearing resilient tapes 106 and 108 coiled within the casing 102 and about the arbor 104. The capacitor 100 is so constructed that the tapes 106 and 108 may be either expanded against the elliptical casing 102 or wound about the circular arbor 104 to vary the shape of the electrodes between elliptical and circular.

Casing 102 is formed of any hard plastic or other non-conductive material and includes an annular shell 110 the internal surface 110a of which is of elliptical cross-section in a vertical plane to provide an elliptical shaping surface surrounding the coiled electrode tapes 106 and 108. Integrally joined to the shell 110 is a plate 112 which acts as the rear wall of a chamber 114 in which the coiled electrode tapes 106 and 108 are disposed. A front wall 115 is cemented against an annular shoulder 110b formed in the shell 110 and located opposite the rear wall 112 to complete the electrode chamber 114. The front wall 115 is thickened by a central boss 115a. Bearings 116 and 118, which are cemented in central openings extending through the boss 115a and rear wall 112 respectively, mount the arbor 104 for rotation so that the electrode tapes 106 and 108 can be reeled on and off the arbor for varying the capacitance. Flanges 116a and 118a formed on the respective bearings 116 and 118 cannot enter the narrowest portions of the central openings in boss 115a and rear wall 112 respectively, and so limit insertion of the bearings into the openings.

The arbor 104 is also formed of hard plastic and includes a horizontal cylindrical shaft 120 extending rotatably through the bearings 116 and 118 and a sleeve 122 secured, as by cementing, over the shaft 120 for rotation therewith to form a spool for the electrode tapes 106 and 108. The external surface 122a of the sleeve is of circular cross-section in a vertical plane to provide a circular shaping surface about which to wind the electrode tape. The rear end of shaft 120 is formed with a flange 120a which cannot enter the narrowest part of the opening in bearing 118, thus limiting insertion of the shaft 120 thereinto.

In order to seal the electrode chamber 114 against humidity and dust, the rear wall 112 is recessed at 112a adjacent the central opening thereof, and a sealing plate 124 is cemented in the recess 112a. The front end of the casing 102 includes a front cover 126 formed with an annular recess 126a which receives the front end of the shell 110, the cover 126 and shell 110 being cemented together. An annular gasket 128 is inserted between the cover 126 and wall 115 for sealing purposes.

Between the front cover 126 and the wall 115 is a drive mechanism for accurately turning the arbor 104 to adjust the capacitance, and a locking mechanism which insures that the capacitor 100 will hold a given setting between adjustments. Shaft 120 is formed with a reduced tip 120b projecting forwardly from the bearing 116. A plastic yoke 130 is secured to the shaft tip 120b, as by cementing, for rotation therewith. The front end of the yoke 130 is formed with a cross-slot in which is tightly received a transverse driving pin 132 extending beyond the yoke 130 on either side. The pin 132 may be formed of hard plastic or alternatively of "half-hard" brass so as not to affect the capacitance. A driving nut 134 is positioned adjacent the yoke 130, and is formed with a central recess 134a and a pair of transverse slots 134b extending to each side of the central recess 134a, as best seen in FIG. 6. The yoke 130 is received within the central recess 134a and the ends of pin 132 are received within the slots 134b to establish a rotary driving connection between the nut 134 and arbor 104.

As seen in FIG. 4, the forward extent of both the recess 134a and slots 134b is adequate to permit the nut 134 to be pushed rearwardly somewhat before such motion is limited by the pin 132 or yoke 130.

To prevent accidental rotation of the arbor 104 between adjustments, annular disks 136 and 138 formed of a resiliently compressible polymeric foam material such as polyurethane and an annular protective plate 140 formed of hard plastic are interposed between the boss 115a and the nut 134, the resilient disks 136 and 138 yieldably biasing the nut 134 forwardly. The nut 134 and the cover 126 are formed with congruent external and internal frusto-conical surfaces 134e and 126c respectively which meet to restrain rotation of nut 134 when the latter is urged forwardly by the disks 136 and 138. Surfaces 134e and 126c preferably are serrated, knurled, or scored in some fashion as seen in FIG. 6 to increase the restraining effect of their mutual contact.

The nut 134 includes a forwardly protruding boss 134c which is received within an opening 126b in the cover 126 for access from outside the casing 102, the boss 134c being formed with a screwdriver slot 134d for convenient turning of the nut 134. To release and turn the nut 134, the operator engages the slot 134d with a screwdriver and pushes and rotates the nut 134 simultaneously, thereby temporarily compressing the resilient disks 136 and 138 and allowing nut 134 to be depressed rearwardly out of engagement with the cover 126 to permit rotation thereof.

The plate 140 is interposed between the nut 134 and disks 136 and 138 and is secured against rotation to protect the disks from being scored when the nut is depressed and rotated. A pair of locking pins 142 and 144, formed of hard plastic or half-hard brass, are cemented in appropriate bores formed in the internal surface of cover 126 and project inwardly therefrom. These pins pass slidably through appropriate holes in the protective plate 140 to lock the latter against rotation while nevertheless permitting inward displacement thereof so as not to prevent depression of the nut 134.

It will therefore be appreciated that this mechanism securely holds the capacitor in a given setting between adjustments, yet employs no springs. In addition, the simple foam plastic disks which serve instead of springs are used in an environment where the member biased thereby must rotate, yet they are effectively protected from scoring.

The tapes 106 and 108 are formed of resiliently deformable, non-conductive plastice and bear electrodes in the form of coating of any suitable metallic substance plated thereon by conventional printed circuit techniques. The electrode coatings are applied over only one side of each tape, and the tapes are then placed in overlying, parallel, contiguous relationship, with their coated sides facing in the same direction. This places a single thickness of the nonconductive tape between the two coatings to serve as a dielectric, thus forming a capacitor sandwich. When such a sandwich is coiled spirally about itself, the electrode coatings will remain in substantially parallel spaced relationship. The exposed electrode coating will be brought into contact with a portion of the sandwich coiled adjacent thereto, but such portion will be an uncoated tape surface, so that there will always be one thickness of tape dielectric between any two adjacent coils of the electrode coatings to prevent shorting of the capacitor.

The tapes 106 and 108 are arranged in this manner and coiled spirally within the shell 110 and about the arbor 104. The outwardly facing surfaces 106a and 108a, for example, may be the electrode-coated surfaces, so that a single thickness of one or the other of the tapes always separates any two adjacent coils of these coatings to act as a dielectric. The innermost tape 106 is somewhat longer than the outermost tape 108, thus giving the entire winding a tendency to expand outwardly against the shell 110.

In order to provide for reeling the capacitor sandwich coil 106, 108 on and off the arbor 104, the inner ends thereof are secured to the arbor and the outer ends are secured to the shell 110. The inner ends of the tapes 106 and 108 are curled a little less than one turn about the arbor 104 and are secured thereto by a resilient C-shaped clip 150 formed of resilient plastic or half-hard brass. The clip 150 extends less than 360° but more than 180° about the arbor 104 to embrace the arbor and the tape ends and thereby clamp the latter together. The tightness of the clip 150 is selected so that at first the tape ends are secured to the arbor 104 and rotation thereof is consequently effective to wind the tapes 106 and 108 thereabout, but subsequently as the tapes become tightly wound and thus begin to offer substantially more resistance, further turning of the arbor 104 causes it to slip relative to the tapes and the clip 150 so as to prevent breakage of the tapes.

The outer ends of the tapes 106 and 108 are passed through apertures 110c at opposite sides of the shell 110 and are clamped in place by terminal assemblies 152 and 154 respectively which also serve to make electrical contact to the electrode coatings on tape surfaces 106a and 108a respectively. As best seen in the enlarged view of FIG. 9, which shows one of the two identical terminal assemblies, the end of tape 106 protruding through the aperture 110c is turned to lie flat against the outside surface of shell 110 with the electrode-coated surface 106a thereof facing outwardly. The terminal assembly 152 includes a locking member 156 which may be formed of plastic and has conically beveled surfaces 156a at opposite sides thereof. The conical surfaces 156a thus have the cross-sectional shape of arcs of a circle, and opposing surfaces 156b between the opposed arcs lie along chords of that circle. Above and below the apertures 110c raised bosses 158 are integrally formed on the exterior of shell 110. These are also shaped as circular arcs and have conically undercut surfaces 158a shaped to dovetail rotatably with the beveled surfaces 156a in the manner shown in the drawings for locking the member 156 in place over the aperture 110c. The chord surfaces 156b, however, are arranged to fit between the bosses 158 without engaging therewith. The member 156 may therefore be placed between the bosses with the chord surfaces 156b facing the latter, and rotated to interlock the conical surfaces 156a and 158a. Removal is effected by rotating the locking member 156 to disengage the conical surfaces and bring the non-engaging chord surfaces 156b into confronting relationship once again with the bosses 158. A hexagonal nut 156c is integrally formed on the outer surface of the locking member 156 to facilitate turning thereof by means of a wrench. A circular recess 156d formed in the face of locking member 156 immediately adjacent the aperture 110c allows clearance space for the protruding end of the tape 106.

The terminal assembly 152 also includes a terminal post 160 formed of a conductive material and extending through an appropriately sized bore in the locking member 156 and hexagonal nut 156c. The inner end of the terminal post 160 is formed with a circular flange 160a which is received within the recess 156d, limiting insertion of the terminal post into the locking member bore and making electrical contact to the electrode-coated tape surface 106a. The flange 160a has a thickness selected to exert a compressive force against the end of tape 106 when the terminal assembly is locked into the bosses 158, thus clamping the tape end against the exterior of the shell 110 and establishing a firm electrical contact with the electrode-coated surface 106a. An opening 160b is formed in the protruding end of the terminal post 160 to permit the insertion of a lead wire therethrough, the lead wire subsequently being soldered to the terminal post.

With the described arrangement, if it becomes necessary to replace the capacitor 100, the soldered connections to the terminal assemblies 152 and 154 need not be disturbed, as these assemblies can simply be removed from one capacitor 100 and reassembled with another such capacitor.

FIG. 7 is a sectional view similar to that of FIG. 5 showing a capacitor 200 similar in all respects to the capacitor 100 except that the circular and oval shaping surfaces are reversed. The shell 210 has an internal shaping surface 210a which is of circular cross-section, and the arbor 204 includes a sleeve 222 having an external shaping surface 222a which is of elliptical cross-section, in a vertical plane. A clip 250 of appropriate elliptical shape is employed to clamp the tapes 206 and 208 to the elliptical arbor 204.

In the operation of either of the capacitors 100 or 200 the capacitance is varied primarily by varying the configuration of the electrodes between circular and elliptical limits, this being accomplished by winding the electrode-bearing tapes about the arbor or unwinding them from the arbor and allowing them to expand against the shell. Thus the tapes can be wound up to assume the shape of the arbor, as seen in FIG. 7, or unwound to assume the shape of the shell, as seen in FIG. 5, one being elliptical and the other circular according to whether the embodiment of FIG. 5 or FIG. 7 is employed. The tapes can also be reeled to any intermediate position, to adjust the capacitance to any intermediate value. Thus the capacitors 100 and 200 take advantage of the principle that I have discovered regarding the variation of capacitance over a great range as a function of electrode configuration, particularly where the electrodes are spirally disposed.

It will now be appreciated that oval capacitors constructed in accordance with the teachings of this invention have the advantage of being adjustable in an accurate and stable manner over a significantly greater range of capacitance, and of achieving a significantly higher maximum capacitance, than any comparable capacitor not making use of this shape.

The particulars of the foregoing description are intended to be illustrative rather than restrictive, and are subject to a considerable latitude of modification without departure from the novel teachings disclosed herein. Accordingly, the scope of this invention is intended to be limited only as defined in the appended claims, which should be accorded a breadth of interpretation consistent with this specification.

What I claim is:

1. A capacitor comprising a casing having an internal shaping surface, an arbor extending into the interior of said casing and having an external shaping surface, means assembling said casing and said arbor for relative rotation about an axis, said shaping surfaces having differently shaped cross-sections in a plane perpendicular to said axis, one of said shaping surfaces being oval shaped, a resiliently deformable capacitor sandwich coiled within said casing and about said arbor arranged to expand against said casing and terminating in opposite ends adjacent said arbor and said casing respectively, and means securing said opposite ends to said arbor and said casing respectively such that relative rotation of said arbor and said casing reels and unreels said capacitor sandwich against said respective shaping surfaces to vary the configuration thereof.

2. A capacitor comprising a casing having an internal shaping surface, an arbor extending into the interior of said casing and having an external shaping surface, means assembling said casing and said arbor for relative rotation about an axis, said shaping surfaces being of substantially circular and oval cross-sections respectively in a plane perpendicular to said axis, a resiliently deformable capacitor sandwich coiled within said casing and about said arbor arranged to expand against said casing and terminating in opposite ends adjacent said arbor and said casing respectively, and means securing said opposite ends to said arbor and said casing respectively such that relative rotation of said arbor and said casing reels and unreels said capacitor sandwich against said respective shaping surfaces to vary said capacitor sandwich between substantially circular and oval configurations.

3. A capacitor in accordance with claim 2 wherein said securing means comprises a substantially C-shaped clip resiliently embracing said arbor and the end of said capacitor sandwich adjacent thereto in a manner to clamp the same together and to allow slippage therebetween when said capacitor is overwound.

4. A capacitor in accordance with claim 2, the end of said capacitor sandwich adjacent said casing dividing into respective branches each including an electrode, said casing having through openings at spaced locations thereon, said capacitor sandwich branches extending through said respective openings, mounting means on the exterior of said casing adjacent said respective openings, said securing means including respective terminals removably and replaceably mounted on said mounting means in position to engage said respective branches to secure the same to said casing and to make electrical contact with said respective electrodes thereof.

5. A capacitor comprising a casing having an internal shaping surface, an arbor extending into the interior of said casing and having an external shaping surface, means assemblying said casing and said arbor for relative rotation about an axis, said shaping surfaces of said casing and said arbor being of substantially circular and oval cross-sections respectively in a plane perpendicular to said axis, a resiliently deformable capacitor sandwich coiled within said casing and about said arbor arranged to expand against said casing and terminating in opposite ends adjacent said arbor and said casing respectively, and means securing said opposite ends to said arbor and said casing respectively such that relative rotation of said arbor and said casing reels and unreels said capacitor sandwich against said shaping surfaces of said arbor and said casing respectively to wind it into an oval configuration and unwind it into a substantially circular configuration.

6. A capacitor comprising a casing having an internal shaping surface, an arbor extending into the interior of said casing and having an external shaping surface, means assemblying said casing and said arbor for relative rotation about an axis, one of said shaping surfaces of said arbor and said casing being of substantially circular and oval cross-sections respectively in a plane perpendicular to said axis, a resiliently deformable capacitor sandwich coiled within said casing and about said arbor arranged to expand against said casing and terminating in opposite ends adjacent said arbor and said casing respectively, and means securing said opposite ends to said arbor and said casing respectively such that relative rotation of said arbor and said casing reels and unreels said capacitor sandwich against said shaping surfaces of said arbor and said casing respectively to wind it into a substantially circular configuration and unwind it into an oval configuration.

7. A capacitor comprising a casing, an arbor extending into the interior of said casing, bearing means on said casing mounting said arbor for rotation relative to said casing, said casing having an opening adjacent said arbor, a driving member positioned between said arbor and said opening, said driving member being formed with means positioned in relation to said opening to be accessible from outside said casing for axially depressing and turning said driving member, means providing an axially slidable rotary driving connection between said arbor and said driving member, and resilient means arranged to yieldably bias said driving member axially against said casing for contact therebetween to restrain turning of said driving member.

8. A capacitor comprising a casing, an arbor extending into the interior of said casing, bearing means on said casing mounting said arbor for rotation relative to said casing, said casing having an opening adjacent said arbor, a driving member positioned between said arbor and said opening, said driving member being formed with means positioned in relation to said opening to be accessible from outside said casing for axially depressing and turning said driving member, means providing an axially slidable rotary driving connection between said arbor and said driving member, resilient disk means arranged to yieldably bias said driving member axially against said casing for contact therebetween to restrain turning of said driving member, a protective plate interposed between said resilient disk means and said driving member, and means secured to said casing and engaging said protective plate in a manner to permit axial depression thereof whereby to permit axial depression of said driving member out of restraining contact with said casing but to prevent rotation of said plate whereby to prevent scoring of said resilient disk means when said driving member is turned.

9. A capacitor comprising a casing, an arbor extending into the interior of said casing, bearing means on said casing mounting said arbor for rotation relative to said casing, said casing having an opening adjacent said arbor, a driving member positioned between said arbor and said opening, said driving member being formed with means positioned in relation to said opening to be accessible from outside said casing for axially depressing and turning said driving member, means providing an axially slidable rotary driving pin-and-slot connection between said arbor and said driving member, resilient disk means arranged to yieldably bias said driving member axially against said casing for contact therebetween to restrain turning of said driving member, a protective plate interposed between said resilient disk means and said driving member, and pin means secured to and extending axially inwardly from said casing and extending slidably through said protective plate to permit axial depression thereof whereby to permit axial depression of said driving member out of restraining contact with said casing but to prevent rotation of said plate whereby to prevent scoring of said resilient disk means when said driving member is turned.

References Cited by the Examiner

UNITED STATES PATENTS

| | | | |
|---|---|---|---|
| 1,385,379 | 7/1921 | Kratz | 317—260 |
| 1,551,661 | 9/1925 | Hill | 317—249 |
| 2,350,823 | 6/1944 | Robinson | 317—249 |
| 2,673,624 | 3/1954 | Huber | 188—67 |
| 2,759,569 | 8/1956 | Keehn | 188—152 |
| 2,944,199 | 7/1960 | Hudson | 317—249 |
| 2,984,776 | 5/1961 | Barnes | 317—249 |

JOHN F. BURNS, *Primary Examiner.*

SAMUEL BERNSTEIN, *Examiner.*